March 13, 1956  A. M. PIERCE  2,737,750

FISH LURE

Filed Sept. 2, 1954

Arnold M. Pierce
INVENTOR.

BY
Attorneys

United States Patent Office 2,737,750
Patented Mar. 13, 1956

2,737,750
FISH LURE

Arnold M. Pierce, Stockton, Calif., assignor of ten per cent to Flora M. Pierce, Stockton, Calif.

Application September 2, 1954, Serial No. 453,829

1 Claim. (Cl. 43—42.33)

The present invention relates to new and useful improvements in artificial fish baits or lures and has for its primary object to provide, in a manner as hereinafter set forth, a device of this character comprising light reflecting means of a novel construction and arrangement for attracting fish.

Another very important object of the invention is to provide an artificial fish lure of the aforementioned character comprising unique means for mounting the reflective elements in the device in a manner to fully enclose and protect said elements and preserve the lustre thereof indefinitely.

Still another important object of the invention is to provide an artificial fish lure of the character described which will be caused to rotate as it is drawn through the water.

Other objects of the invention are to provide an artificial fish lure which will be comparatively simple in construction, durable, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein.

Figure 1:
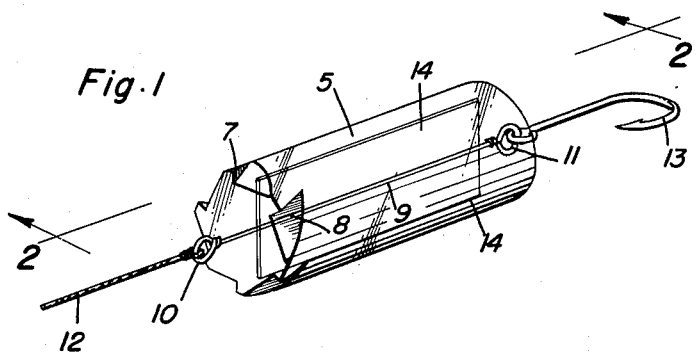
Figure 1 is a perspective view of an artificial fish lure constructed in accordance with the present invention.
Figure 2:
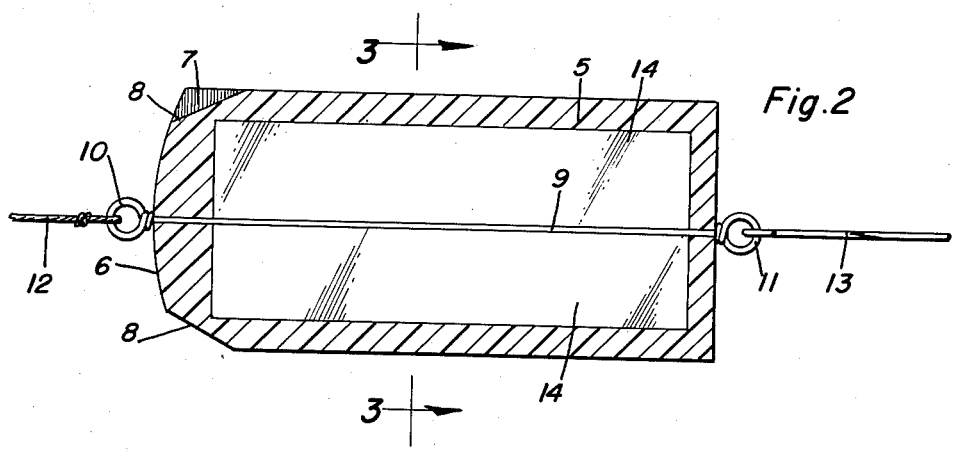
Figure 2 is a view in vertical longitudinal section through the device, taken substantially on the line 2—2 of Figure 1.
Figure 3:
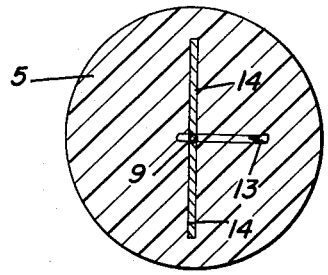
Figure 3 is a cross-sectional view, taken substantially on the line 3—3 of Figure 2.

Referring now to the drawing in detail, it will be seen that the embodiment of the invention which has been illustrated comprises an elongated body 5 of a suitable transparent plastic, which body is of cylindrical cross-section for a greater portion of its length. The body 5, which is molded, terminates in a substantially convex forward or leading end portion 6. The forward end portion 6 of the body is peripherally notched or recessed in a manner to define integral impeller means 7 for causing said body to rotate as it is drawn through the water. These notches or recesses also define flat light reflecting surfaces or facets 8 at an incline from the peripheral surface of the body toward said leading end. The cooperating radial surfaces of said notches also define light reflecting facets.

Extending longitudinally through the body 5 is a centrally located rod 9 of suitable metal. The rod 9 extends beyond the ends of the body 5 and terminates in loops or eyes 10 and 11. A line 12 is connected to the loop 10 on the forward end of the body 5. A conventional hook 13 is loosely connected to the rear loop 11.

It may be well to here state that the body 5 is preferably formed in a suitable mold with the rod 9 therein. Also molded longitudinally in the body 5 on opposite sides of the rod are longitudinally extending, highly reflective foil strips or plates 14 of any suitable material. The inner longitudinal edges of the reflective strips 14 are secured to the metallic rod 9 in any suitable manner.

It is believed that the operation of the device will be readily apparent from a consideration of the foregoing. Briefly, as the lure is drawn through the water in the usual manner through the medium of the line 12, the cylindrical body 5 is caused to rotate rapidly by the impeller means 7. As the body 5 rotates, the foil strips or sheets 14 reflect the light through the transparent plastic comprising said body for attracting fish to the lure. It is to be noted that the elements 14 are fully enclosed in and protected by the transparent body 5, thus preserving the lustre of said elements indefinitely.

It is believed that the many advantages of an artificial fish lure constructed in accordance with the present invention will be readily understood, and although a preferred embodiment of the device is as illustrated and described, it is to be understood that changes in the details of construction may be resorted to which will fall within the scope of the invention as claimed.

What is claimed is:

An artificial fish lure comprising a solid elongated transparent plastic body molded to prescribed shape and of uniform cylindrical cross-section for a greater portion of its length from end to end and having a convex leading end, the peripheral portion of said leading end having circumferentially spaced notches, said notches being sector-shaped and defining circumferentially spaced radial flat-faced impeller means, that portion of the notch adjacent said means being flat and at an incline from the peripheral surface of the body toward the leading end thereof and providing a light reflecting facet, the principal flat faces of said notches likewise providing complemental light reflecting facets, a rod embedded centrally in and extending axially through and beyond the ends of said body, and a pair of flat coplanar light reflecting plates also embedded in said body and situated along diametrically opposite sides of said rod with their inner lengthwise edges fastened to cooperating portions of said rod, said plates having reflective properties, being equal in length but of a length less that that of said body, and each of a width less than one-half the cross-section of said body, whereby the respective outer lengthwise edges are spaced radially inward from the peripheral surface of said body and the forward and rearward ends are spaced inwardly from the respective forward and rearward ends of said body.

References Cited in the file of this patent

UNITED STATES PATENTS

| 1,725,636 | Heaslip | Aug. 20, 1929 |
| 2,592,445 | McCarthy | Apr. 8, 1952 |
| 2,596,883 | Wise | May 13, 1952 |
| 2,597,982 | Fitzgerald | May 27, 1952 |